3,243,311
METHOD OF PREPARING IMPROVED ASPHALT AGGREGATE STRUCTURES COMPRISING PRETREATING THE AGGREGATE WITH A POLYVALENT METAL COMPOUND
Dilworth T. Rogers, Summit, and John C. Munday, Cranford, N.J., assignors to Esso Research and Engineering Company, a corporation of Delaware
No Drawing. Filed Apr. 5, 1962, Ser. No. 185,202
10 Claims. (Cl. 106—280)

This application is a continuation-in-part of our copending application Serial No. 178,038, filed on March 7, 1962, and now abandoned.

The present invention concerns bitumen stabilized aggregate compositions and the method of preparing these compositions. In particular, the invention relates to pretreated stabilized asphalt soil compositions having superior structural characteristics, and to the compositions and methods of pretreating the soil or other subdivided solids to obtain enhanced compressive strengths and excellent solvent resistance.

In the past, particularly in arid or semiarid regions, asphalt emulsions and cutbacks have been admixed with clay type soils to prepare building blocks suitable for some types of home construction. These compositions, when compacted by hand tamping in open molds and sun dried, produced economic building blocks of very low, but usable, dry compressive strength. These asphalt soil stabilized compositions generally containing less than 6 wt. percent of asphalt were extremely poor in wet compressive strength, which wholly precluded the adoption of these compositions in regions of varying humidity or where direct water contact with the building material was possible. Another disadvantage of these compositions was the lack of adhesion to their exterior surfaces of other materials, such as paint, mortar, stucco tile and the like, due in part to the expansion and contraction of the form with changes in the humidity.

The low dry and unsuitable wet unconfined compressive strengths of these asphalt-soil compositions and asphalt-solid compositions may be considerably enhanced by the exclusion of water as the compacting lubricant, and by the employment of asphalt concentrations of over 8 wt. percent asphalt, e.g. 8 to 30 wt. percent. Asphalt stabilized soil compositions of enhanced dry and wet compressive strength are produced by employing a substantially dry or low moisture content soil or other organic or inorganic solid aggregate material containing less than 5 wt. percent, e.g. less than 1.0 wt. percent or even 0.1 wt. percent, moisture.

In the method defined as the dry compaction method, as described in our parent application, the disclosures of which are incorporated by reference, the solid aggregate material is thoroughly admixed with an asphalt-solvent cutback comprising from 30 to 90 wt. percent of asphalt having an ASTM D-36 softening point of at least 100° F. and a volatile organic asphalt solvent, preferably a hydrocarbon boiling below 400° F., e.g. less than 300° F. The solvent is then removed by heating or evaporation to obtain a substantially dry pulverulent mixture having a residual and critical solvent content of between 0.4 and 4.0 wt. percent and compaction, e.g., from 1000 to 5000 p.s.i., is carried out at a time when the ASTM D-5 penetration value of the asphalt-solvent is between 20 and 335 mm./10, e.g. 30 to 250. The object is then cured at a temperature of from 150° to 500° F. or higher for periods of time of from 2 hours to 300 hours to produce shaped articles of manufacture and load bearing structures of enhanced dry and wet compressive strengths.

The wet compaction method as known in the prior art generally comprises mixing an asphalt cutback with a clay type soil which has been wet with water. In this method, water serves to break up soil aggregates and acts as a compaction lubricant. The asphalt composition of the final product is normally from 2 to 8 wt. percent. The dry compaction method, while providing stabilized compositions of excellent strength, still does not provide for compressive strengths required for special purposes, e.g. a compressive strength of over 5000 p.s.i. An additional detracting quality of the compositions of both the dry and water compaction methods and materials is their inability to retain their strength or structural form in the presence of organic solvent vapors or in physical contact with liquid organic solvents. Thus, asphalt solvents in contact with these stabilized materials dissolve or sufficiently soften the asphaltic binding agent to make these materials of reduced value for particular applications. This limiting characteristic inhibits the employment of the products of even the dry compaction method in pavements, airport runways, driveways, roads, culverts and other areas where contact or spillage of solvent or petroleum fuel is possible, or in containers or pipes used for solvent transport.

It has now been found that asphalt solid compositions prepared by either the wet or dry compaction method can be stabilized and extraordinarily enhanced in both wet and dry compressive strength by the selected pretreatment of the subdivided aggregate solid material of the composition with a pretreating agent. It has been discovered that pretreatment of a soil composition with a pretreating agent prior to mixture or impregnation with the asphaltic binder material yields stabilized aggregate structures of considerably enhanced structural strength. This discovery is of wide commercial importance, since it allows the formation of economical asphalt clay structures, such as bricks, with very high compressive strength. Additionally, the selected pretreatment of the soil also provides compositions that are resistant and substantially unaffected by asphalt solvents like hydrocarbon oils boiling in the range between 75° and 900° F., such as gasoline and jet fuels. These pretreating agents also accelerate the curing of the asphalt and thus reduce the curing time needed for high strength structures. Further advantages of pretreatment permit the utilization of less asphalt for the same compressive strengths, while pretreatment also permits the use of thinner walls in buildings, blocks, and tiles. The enhanced dry and wet compressive strength, coupled with the solvent resistant qualities imparted to stabilized compositions of both the dry and water compaction method by the pretreatment of the solid material, overcomes the major disadvantages of the prior art compositions and methods.

The highly stabilized materials of the invention are produced by pretreating the subdivided solid aggregate with a pretreating agent which can oxidize, cross link, polymerize or catalyze the oxidation, cross linkage or polymerization of the organic binder employed. These pretreating agents will be referred to hereafter by the term "cross linking agents." These cross linking agents effect the hardening of the asphalt aggregate into materials of enhanced strength and solvent resistance. These cross linking agents are normally employed by pretreating the solid aggregate, thoroughly admixing the pretreated aggregate with asphalt or other organic binders by the wet or preferably the dry compaction method, which asphalt or binder is subject to cross linking or hardening by the action of the cross linking agent at elevated temperatures, e.g. over 100° F., compacting the pretreating solid-binder mixture to the desired form, and then curing the compacted mass to promote removal of the compaction lubricant of residual water or solvent and to accelerate the cross linking of the binder material, thereby forming a hard, dense structure of high strength and solvent resistance. The cross linking or oxidization of the bitumen binder, such as asphalt, can be most conveniently carried out as part of the curing step by the use of elevated temperatures such as 150° to 500° F., or at higher temperatures provided that the rate of temperature change is suitably controlled to reduce thermal shock of the composition.

The treating compounds of the invention may comprise metallic or nonmetallic, organic or inorganic materials or any combination or mixtures thereof which will function as a cross linking agent for the organic binder material such as to oxidize or polymerize or catalyze and thereby harden the binder. The pretreatment compounds also improve the adhesivity of binder and solid, probably by the introduction of polar groups.

This invention is particularly directed to those solid aggregate materials such as clay type soils stabilized by the use of an asphaltic binder with the preferred cross linking agent being a metallic agent capable of being reduced that is serving as an oxidizing agent for the asphaltic binder. Suitable cross linking agents include those salts of polyvalent metals in which the metal is present as one of the higher oxidation states, for example, in other than lowest oxidation state such as those metals having oxidation states or valences or two or more such as three, four, five, six or seven. The term "oxidation state" is employed to indicate the charge on a simple metallic anion or the charge which is assumed to be on the metallic atom to account for the number of electrons involved in the oxidation or reduction of the atom to the free element. The metallic cross linking agents include both water soluble and hydrocarbon or oil soluble compounds, and may include the salts of strong and weak organic and inorganic acids as well as metal complexes such as $C_1$ to $C_{30}$ fatty acids, mineral acids, etc. Readily available salts and oxides such as the halides like chlorides, iodides, bromides, fluorides or the nitrates, oxides and hydroxides are the preferred water soluble compounds. However, sulfates, acetates, oxalates, chlorates, chromates, ferricyanides, ferrocyanides, thiosulfates, or other oxygen, halogen, sulfur and nitrogen containing elements in combination with the polyvalent metals and the like may also be employed.

The cross linking metal compounds can also include those mono-, di-, tri- or polymetal compounds containing one or more of the active metallic cross linking elements such as those multimetallic compounds containing alkali or alkaline earth elements such as potassium permanganate, potassium, ferricyanide, sodium chromate or dichromate, and the like. Suitable metal elements comprise Group I metals such as copper; Group IV metals such as tin, titanium and lead; Group V metals such as vanadium, antimony and arsenic; Group VI metals such as chromium, selenium, molybdenum and tungsten; Group VII metals such as manganese; Group VIII metals such as iron, cobalt and nickel; rare earth metals of the Lanthanide series having atomic numbers of from 58 to 71; or any combination and mixture thereof. Metallic compounds of particular efficacy in aqueous solution are ferric chloride, cupric chloride, chromic oxide, vanadic pentachloride, potassium permanganate, cupric sulfate, cupric hydroxide, and the like. Some cross linking agents may be applied to the aggregate in organic solvents such as ethers like diethyl ether, diisopropyl ether; alcohols like methanol, ethanol, isopropanol, butanol; ketones like acetone or methylethyl ketone; hydrocarbons like benzene, toluene, xylene, heptane, petroleum naphtha or the like. Naturally, these pretreating agents may be applied directly to the aggregate or in solution form such as in solution concentrations of from 1 to 30 wt. percent, e.g. 1 to 5 or even higher.

Other cross linking agents suitable for use in pretreatment of the soils include a variety of organic cross linking agents for asphalts or other binders, especially those organic agents comprising the polar elements of phosphorus, oxygen, halogen, sulfur or nitrogen and combinations thereof, or combinations with hydrogen or carbon or both hydrogen and carbon, such as phosphorus pentasulfide, nitric acid, phosphorus pentoxide, sulfur and sulfur dichloride. It is, of course, recognized that it is not economical to use acidic type agents to pretreat carbonate type aggregates such as limestone or dolomite.

The exact concentration of the cross linking agent and of the binder depends on the nature and amount of the subdivision of the solid aggregate material and the amount and type of the organic binder. Generally, in the stabilization of clay soil with ordinary asphalt, the pretreated soil should contain small amounts of from about 0.1 to about 5.0 wt. percent of the cross linking agent, e.g. from 0.1 to about 2.0 wt. percent, with from 3.0 to about 30 wt. percent, e.g. 8 to 25 wt. percent, of the binder, such as asphalt. The more finely divided materials like clay require larger amounts of cross linking agent and of asphalt binder than do coarser materials having less surface area, such as sand and graded aggregate.

Treatment of the subdivided solid material may be accomplished by impregnation, coating, spraying, sublimation, or otherwise directly or indirectly contacting the solid material with the cross linking agent. The preferred method is to impregnate the soil with an aqueous or organic solvent solution of the cross linking agent, followed by removal of the solvent from the treated soil prior to admixture with the asphalt. When the soil pretreating agent tends to hydrolyze in the presence of water, e.g. $FeCl_3$, this may be repressed by adding hydrochloric acid to the water solution of the pretreating agent.

The binder employed in the present invention comprises that family of materials commonly referred to as asphalts, such as natural or petroleum residua of thermoplastic solid or semisolid consistency at ambient temperatures, normally of brown to black cementitious material in which the predominating constituents are bitumens. The bituminous material to be used may be selected from a wide variety of natural and industrial products. For instance, various natural asphalts may be used such as natural Trinidad, gilsonite, Grahamite and Cuban asphalts. Petroleum asphalts suitable for the purposes of this invention include those asphalts obtained from California crude, from tar sands, Venezuelan or Mexican petroleum asphalt or a Middle East or Mid-Continent airblown oil and the like, or combinations thereof. Petroleum asphalts also include those asphalts derived from hydrocarbon feed stocks such as bitumen, asphaltic residua obtained in a petroleum refining process such as those obtained by the vacuum distillation of petroleum hydrocarbon crude oils, the solvent deasphalting of crude residuum fractions, tarry products from the chemical refining such as oxidation of high molecular weight hydrocarbons, those asphalts obtained from hydrogenated coal products, the asphaltic material obtained in the thermal or catalytic cracking of petroleum to obtain gasoline or other light fractions or any combination of these materials.

Although the petroleum asphalts are preferred, other suitable bituminous material would include coal tar, wood tar, and pitches from various industrial processes. The invention can also be successfully practiced with chemically modified asphalts such as halogenated, e.g. chlorinated or sulfurized or phosphosulfurized asphalts, as well as asphalts treated with epoxides or haloepoxides like ethylene oxide and epichlorohydrin, or with silane halides, nitrobenzene, chlorinated aliphatics such as carbon tetrachloride and halohydrocarbons such as methylene chloride and the like. Additionally, the asphalts can be mixed in major or minor amounts, e.g. 1 to 10 wt. percent, with other natural and synthetic thermoplastics and thermosetting materials like rubbers, resins, polymers and elastomers of an oil, resinous or rubbery nature. Nonlimiting examples of suitable materials include polyolefins, polypropylene, polyethylene, polyisobutylene and the like;

natural or synthetic rubber like butyl rubber, halogenated butyl rubber, polydienes like polybutadiene, elastomeric copolymers of styrene and butadiene, copolymers of ethylene and propylene, and the like; epoxy resins; polyalkylene oxides; natural and synthetic waxes; polyvinyl acetates; phenol aldehyde condensation products; and the like and combinations thereof.

Furthermore, in a modification wherein the asphalt is chemically modified by reaction with liquid reagents, for example, $CCl_4$, the reagent liquid can often be used as the asphalt solvent, whereupon the desired reaction occurs before, after or during the compaction of the soil-asphalt cutback mixture or after or during the curing step, or the reaction may occur continuously during both finishing process steps.

Bitumen subjected to any of the commonly used petroleum or refining and treating processes such as distillation, steam reduction, solvent separation or blending, and the like can be employed. The invention is of particular value with oxidized asphalts, for example, those asphalts prepared by air blowing or chemically oxidizing asphaltic residua at elevated temperatures (400° to 500° F.) with or without the presence of catalytic agents such as compounds of phosphorus (like phosphorus pentoxide) or of the transition metals (like ferric chloride). These oxidized asphalts commonly have ASTM softening points of at least 100° F., e.g. 100° to 300° F. or higher. Those asphalts and especially those oxidized asphalts and straight reduced asphalts having an ASTM softening point of 100° F. and above and an ASTM D–5 penetration at 77° F. of 315 or below are the preferred asphalts of the invention.

The foregoing bituminous materials are preferably applied to the pretreated solid in the form of a solvent cutback. The cutback solvent should preferably be one that is sufficiently volatile to be substantially volatilized during the selected curing step, i.e. a solvent having a boiling point of less than 600° F. or advantageously less than 400° F., such as a petroleum naphtha or other hydrocarbon solvent boiling within the range of about 175° to 600° F., e.g. 200° to 400° F. Suitable asphalt concentrations in the cutback solution are from 30 to 90 wt. percent asphalt, for example, 50 to 75 wt. percent. Preferably, the Furol Viscosity at the temperature at which the cutback is applied should be 100 or less, e.g. 20 to 100 Furol. Suitable cutback solvents would thus include, but are not limited to, hydrocarbons such as toluene, benzene, xylene, Varsol, VM & P naphtha, halohydrocarbons such as carbon tetrachloride and methylene dichloride, or any combinations thereof.

The cutback asphalt compositions may contain other additive agents such as wetting and emulsifying agents and antistripping agents. The asphalt cutback should be used in an amount sufficient to provide at least 8 to about 30 wt. percent asphalt or higher based on the soil, with maximum compressive strengths usually attained at 10 to 20, e.g. 12 to 16, wt. percent asphalt. The amount and character of the cutback solvent should be such that the cutback composition will have the proper coating viscosity, since the failure to thinly and uniformly coat a considerable majority, e.g. over 95%, of the solid particles will greatly affect the dry, and especially the wet, compressive strength of the resulting compacted object. A thick coating occasioned by a viscous asphalt cutback will be wasteful of materials and also tends to create low strength structures.

The solid material of the stabilized compositions is any dry inorganic or organic solid material, with earth and soil the economically preferred solid materials for the production of hard, dense structures useful in building construction. The solid aggregate material may comprise combinations of materials of natural or synthetic origin with or without the presence of clay type soils. For example, combinations include 10 to 60% clay with iron ore fines, coke, graphite, or other material. Suitable nonlimiting examples of other aggregate materials include finely subdivided cinder, expanded slag or clay, rock wool, steel wool, abrasives, expanded clays, cellulose fibers, sawdust, cane fibers, bagasse, hemp, jute, coke, iron ore, diatomaceous earths, clays, soil, silt, coal, asbestos, glass fibers, wood chips, quartz, carbonate rocks, volcanic ash, bamboo, and the like, and any combination thereof.

The present invention has importance in the stabilization of earth or soil to form building materials such as blocks, bricks, tile, board, pipe and the like. The aggregate normally contains an average particle size diameter of between 0.002 mm. and 2 mm., but may be higher or lower, with soil preferably having a clay content of between 10 and 60 wt. percent, e.g. 20 to 40 wt. percent. The soil normally utilized is composed mainly of a mixture of gravel having an average diameter of over 2 mm., sand having an average diameter of from 2.0 to 0.074 mm., silt having an average diameter of from 0.074 to 0.005 mm. and clay having an average diameter below 0.005 mm. To utilize the natural strength of clay, soils having a clay content of from 10 to 60 wt. percent, e.g. 20 to 40 wt. percent, are advantageous.

Compaction of the pretreated soil-asphalt mixture may be accomplished by hand tamping in open molds, but preferably is accomplished by compacting or extruding the mixture into the desired shape such as rod, tube, pipe, sheet, brick, block, etc., at a pressure of more than 200 p.s.i., such as more than 1000 p.s.i., or between 1000 p.s.i. and 10,000 p.s.i. Compacting can be accomplished with static confined molds, or the mixture can be extruded through dies or cast centrifugally. Temperatures during compaction may be normal ambient temperatures, such as 75° F., or elevated temperatures, such as between 100° F. and 500° F.

Curing of the compacted mass is preferably accomplished by heating the compacted mass at an elevated temperature for a sufficient period of time to effect the reaction of the cross linkage agent with the binder material. This is generally accomplished at temperatures of above 200° F. and usually at temperatures between 200° F. and 500° F. or higher such as for periods of time varying from about 1 to 300 hours, e.g. 2 to 24 hours. It is, of course, recognized that the compacting and curing steps may be carried out simultaneously by using elevated temperatures during compaction.

The invention is more fully illustrated by the following examples.

EXAMPLE 1

A red clay soil obtained in the Linden, New Jersey, area had the following particle size analysis:

| Particle size (diameter or mesh): | Wt. percent finer |
|---|---|
| 20 mesh | 100 |
| 40 mesh | 92 |
| 60 mesh | 84 |
| 100 mesh | 75 |
| 200 mesh | 64 |
| 325 mesh | 58 |
| 0.021 mm. | 50 |
| 0.010 mm. | 38 |
| 0.005 mm. | 27 |
| 0.001 mm. | 22 |

(a) Briquettes were made from 125 grams of the air-dried N.J. red clay in molds about 1.3″ in diameter, compressing from both ends at 2350 p.s.i. for 5 minutes. The soil was first moistened with 10 wt. percent water, based on the soil, to serve as a molding lubricant. The resulting briquettes had a height/diameter ratio slightly greater than 2/1. They were cured at 300° F. for 16 hours, and the compressive strength of the unconfined briquettes was measured using a loading rate of 2 inches/minute.

(b) N.J. red soil was treated with a water solution containing 1 wt. percent of $CuSO_4.5H_2O$ (based on the soil) by making a slurry of the soil and the pretreating agent in water. Sufficient NaOH was added to convert the copper sulfate to the hydroxide. After drying at steam bath temperatures, the treated soil was moistened with 10 wt. percent water and then formed into briquettes and cured and tested as in (a).

(c) N.J. red clay, moistened with 10 wt. percent water, was thoroughly mixed with 6 wt. percent of a 213° F. softening point oxidized asphalt, applied as a 2/1 asphalt/toluene cutback, and was formed into briquettes and cured and tested as in (a).

(d) Experiment (c) was repeated using the copper treated soil prepared as in (b).

The briquettes prepared as in experiments (a) to (d) were tested both dry and after soaking in distilled water for 7 days. The results are shown in Table I.

*Table I*

EFFECT OF PRETREATMENT ON THE STABILIZATION OF NEW JERSEY RED CLAY SOIL

| Metal Compound | Asphalt, Wt. Percent | Compressive Strength, p.s.i. | |
|---|---|---|---|
| | | Dry | Wet (7 days) |
| (a) None | None | 500 | 0 |
| (b) Cu(OH)$_2$ | None | 890 | 0 |
| (c) None | 6 | 860 | 520 |
| (d) Cu(OH)$_2$ | 6 | 1,610 | 735 |

The data in Table I obtained by the wet compaction method demonstrate that the soil itself has a low compressive strength when dry and disintegrates when wet, while the cupric hydroxide pretreatment alone increases the dry strength somewhat but has no effect on wet strength. The asphalt alone at the low concentration level of 6 wt. percent increases the dry strength somewhat and raises the wet strength, but a much greater improvement is obtained by the combination of the cupric hydroxide pretreatment and asphalt. In fact, this particular combination and method gives dry strengths which far exceed, and wet strengths which equal or exceed those of commercial cinder blocks.

Similar experiments have shown that excellent results are obtained when the metallic compounds which is used to pretreat the solid is CuCl$_2$.2H$_2$O, CuSO$_4$.5H$_2$O, FeCl$_3$, FeCl$_3$.6H$_2$O, CrO$_3$, KMnO$_4$ and VCl$_5$. In contrast, the nonoxidizing, nonpolymerizing compounds containing metals at lower oxidation states such as ZnCl$_2$, NiCl$_2$, V$_2$O$_5$, Fe$_2$O$_3$, Fe$_3$O$_4$, CuO, CaCl$_2$, CaO and the like, were wholly ineffective in increasing compressive strengths.

EXAMPLE 2

A sandy brick clay obtained in the Sayreville, New Jersey, area, known as Sayreville-Roxburgh sandy clay, had the following particle size analysis:

| Particle size (diameter or mesh): | Wt. percent finer |
|---|---|
| 20 mesh | 100 |
| 40 mesh | 98 |
| 60 mesh | 89 |
| 100 mesh | 67 |
| 200 mesh | 42 |
| 325 mesh | 39 |
| 0.02 mm. | 35 |
| 0.006 mm. | 30 |
| 0.001 mm. | 16 |

The effect of treating the Sayreville-Roxburgh clay with various amounts of cupric chloride and ferric chloride before impregnating with a 213° F. softening point oxidized asphalt is shown in Table II. The metal chloride was applied as a water solution, followed by drying at steam bath temperatures. The briquettes were made and tested using the methods described in Example 1, with the exception that the dry compaction method was used for asphalt concentrations of 8 wt. percent and over. In most cases, air-dried rather than water-moistened clay was used, since this gave stronger briquettes, and a more dilute asphalt/toluene cutback (50/50 or 57/43) was generally used. Also, whereas in Example 1 the briquettes were formed immediately after mixing, in the present series most of the cutback solvent was evaporated after mixing but before compacting, so as to leave only about 1% to 3% of solvent, based on the clay. This modification resulted in a substantially dry powder which compacted to denser, stronger briquettes.

*Table II*

EFFECT OF PRETREATMENT ON STABILIZATION OF SAYREVILLE-ROXBURGH SANDY CLAY

[Compacted at 2,350 p.s.i. for 5 minutes. Cured at 300° F. for 16 hours]

| Pretreatment | | Test Condition [1] | Wt. Percent Asphalt | | | | | | | |
|---|---|---|---|---|---|---|---|---|---|---|
| Compound | Wt. Percent on Clay | | 0 | 6 | 8 | 10 | 12 | 14 | 16 | 18 |
| | | | Compressive Strength, p.s.i. | | | | | | | |
| None | 0 | Dry | [4] 270 | [4] 370 | 650 | 1,050 | 1,550 | 1,450 | 1,240 | 930 |
| | | Wet | [4] 0 | [4] 280 | 480 | 860 | 1,430 | 1,430 | 1,280 | 960 |
| CuCl$_2$.2H$_2$O | 0.68 | Dry | [4] 670 | [4] 1,420 | 1,590 | 2,340 | 2,840 | | | |
| | | Wet | [4] 0 | [4] 860 | 1,000 | 1,760 | 2,210 | | | |
| CuCl$_2$.2H$_2$O | 1.0 | Dry | | | 1,700 | 3,780 | [2] 4,100 | | | |
| | | Wet | | | 1,020 | 2,870 | [3] 3,080 | | | |
| CuCl$_2$.2H$_2$O | 2.0 | Dry | | | | 4,410 | 4,920 | | | |
| | | Wet | | | | 2,950 | 3,320 | | | |
| FeCl$_3$.6H$_2$O | 1.0 | Dry | | | 1,700 | 5,720 | 3,885 | | | |
| | | Wet | | | 760 | 2,780 | 1,750 | | | |
| FeCl$_3$.6H$_2$O | 1.24 | Dry | | [4] 1,100 | | | | | | |
| | | Wet | | [4] 675 | | | | | | |

[1] Compressive strength dry or wet (after immersion in water for 7 days).
[2] 6,170 p.s.i. when cured at 400° F.
[3] 3,515 p.s.i. when cured at 400° F.
[4] Clay moistened with water; all others air-dry (0.5% moisture) using the dry compaction method.

The data in Table II show that the maximum compressive strengths of the untreated Sayreville-Roxburgh clay and 12 wt. percent of 213° F. S.P. oxidized asphalt are 1550 p.s.i. dry, and 1430 after soaking in water for 7 days. When, however, the clay was pretreated with either cupric chloride or ferric chloride, both dry strength and wet strength increased markedly. Thus, with 0.68 wt. percent cupric chloride on the clay, the strengths were 2840 p.s.i. dry and 2210 p.s.i. wet; while with 2 wt. percent the strengths were 4920 p.s.i. dry and 3320 p.s.i. wet. Similarly, with ferric chloride excellent results were obtained, 1.0 wt. percent on the clay giving compressive strengths of 5720 p.s.i. dry and 2780 p.s.i. wet.

EXAMPLE 3

Organic solvents can be used in the pretreating step. For example, when 1.15 wt. percent of anhydrous $FeCl_3$ in toluene was used to pretreat Sayreville-Roxburgh clay, and the product dried and combined with 12% 213° F. S.P. oxidized asphalt, compressive strengths of 5010 p.s.i. dry and 3385 p.s.i. wet were obtained. In contrast, when the same amount of $FeCl_3$ was added instead to the asphalt cutback, the compressive strengths were only 1750 p.s.i. dry and 1000 p.s.i. wet. These results can be compared with 1550 p.s.i. dry and 1430 p.s.i. wet for no pretreatment. It is obvious that pretreating the soil, thus ensuring that the reactions take place at the soil-asphalt interface, is far better than adding the pretreating agent to the asphalt and is a primary feature of the invention.

EXAMPLE 4

In this example, it is shown that pretreating a N.J. sandy clay soil with either $FeCl_3$ or $CuCl_2$ leads not only to the formation of structures having high compressive strength, but to high tensile strength as well. The tensile measurements were made on cylinders 1.3" x 3" using the method described by N. B. Mitchell, "The Indirect Tension Test for Concrete," ASTM Materials Research and Standards, 780, October 1961. Data are given in Table III.

EXAMPLE 6

In this example, it is shown that as a consequence of pretreating a soil with an oxidizing or cross linking agent such as cupric chloride, the resistance of the binder (asphalt) to organic solvent is drastically increased.

The N.J. sandy clay (Sayreville-Roxburgh) was pretreated with 1.0% $CuCl_2.2H_2O$, mixed with 12% 213° F. S.P. oxidized asphalt, and formed into a briquette as described in Example 2. A second briquette was made in the same manner except that the soil was not pretreated. Both briquettes were stored in gasoline having a high aromatic content (over 10% aromatics). After two days, the briquettes prepared from the untreated soil had completely disintegrated. After one month, the briquette made from the pretreated soil was substantially unchanged.

In a similar fashion, on testing the briquette from untreated soil with boiling benzene, all of the asphalt can be readily extracted. With the briquette made from treated soil, only 25% of the asphalt could be extracted even after pregrinding the briquette before extraction and continuing the extraction for over 24 hours.

In weathering tests also in which the briquettes were coated with oil-base paint, those made from pretreated soil showed no tendency for the asphalt to bleed into and stain the paint as has been observed with blocks made from untreated soil by prior art processes.

*Table III*

EFFECT OF SOIL PRETREATMENT ON TENSILE STRENGTH
[213° F. S.P. oxidized asphalt]

| Soil Pretreatment | Percent Asphalt | Compaction Method [1] | Curing Conditions | Strength, p.s.i. | |
|---|---|---|---|---|---|
| | | | | Compressive | Tensile |
| None | 6 | Wet | 240 hrs.–275° F | 340 | 48 |
| 1% $CuCl_2.2H_2O$ | 6 | Wet | do | 2,060 | 244 |
| 1% $FeCl_3.6H_2O$ | 6 | Wet | do | 1,220 | 148 |
| None | 12 | Dry | do | 2,220 | 366 |
| 1% $CuCl_2.2H_2O$ | 12 | Dry | do | 5,380 | 780 |
| Commercial Cinder Block.[2] | | | | 620 | 92 |

[1] Compaction at 2,350 p.s.i. for 5 minutes.
[2] Tests on 2" x 2" x 4" specimen.

EXAMPLE 5

As shown by the data in Table IV, both the dry and wet compressive strength of N.J. red clay soil can be markedly increased by pretreating the soil with either potassium permanganate or chromic acid anhydride (chromic oxide) at concentrations of 1.0 wt. percent based on the weight of soil. This is true regardless of whether the curing temperature is 150° or 300° F. It will be noted that a pretreating agent such as cupric chloride is also effective when the binder is a straight reduced (unoxidized) residuum.

EXAMPLE 7

A finely divided petroleum coke (manufactured by the Fluid Coke Process and subsequently ground—96% passing a 200 mesh screen) was treated with an aqueous solution of $FeCl_3.6H_2O$ (2% $FeCl_3.6H_2O$ by weight based on the coke) and the water evaporated on the steam bath. A 213° F. S.P. oxidized asphalt (50% in toluene) was mixed with the treated coke, most of the toluene evaporated and the residue was compacted by the "dry" method. In a similar fashion, commercial graphite was treated with an aqueous solution of $CuCl_2.2H_2O$ (1 wt. percent on

*Table IV*

PRETREATING SOIL WITH CROSSLINKING AGENTS
[6% asphalt on soil; compacting liquid $H_2O$; compaction p.s.i. 2,350 for 5 minutes; cured 16 hours]

| Soil | Treating Agent | Percent | Asphalt | Cure, Temp. °F. | Compressive Strength, p.s.i. | |
|---|---|---|---|---|---|---|
| | | | | | Dry | Wet |
| N.J. Red Clay | None | | 213° S.P. Oxidized | 300 | 860 | 520 |
| Do | $KMnO_4$ | 0.25 | do | 300 | 1,200 | 510 |
| Do | $KMnO_4$ | 0.50 | do | 300 | 1,280 | 450 |
| Do | $KMnO_4$ | 1.0 | do | 300 | 1,690 | 1,000 |
| Do | $CrO_3$ | 1.0 | do | 300 | 1,640 | 990 |
| Do | None | | do | 150 | 340 | 100 |
| Do | $KMnO_4$ | 1.0 | do | 150 | 740 | 210 |
| Do | $CrO_3$ | 1.0 | do | 150 | 620 | 510 |
| N.J. Sandy Clay | None | | Binder [1] | 300 | 190 | 180 |
| Do | $CuCl_2.H_2O$ | 0.68 | do | 300 | 880 | 530 |

[1] Straight reduced Venezuelan residuum—89 Pen. at 77° F., 114° F. S.P.

graphite), asphalt applied and the dry mixture compacted. It will be seen by the data in Table V that with both solids pretreating with the metal salt markedly increased the unconfined compressive strength.

Table V

EFFECT OF PRETREATING SOLIDS OTHER THAN SOILS
[Curing—16 hours at 300° F. Compaction—2350 p.s.i. for 5 minutes]

| Solid | Percent Asphalt | Pretreatment | Compressive Strength, p.s.i. |
| --- | --- | --- | --- |
| Petroleum Coke | 22.0 | None | 870 |
| Do | 22.0 | 2% $FeCl_3.6H_2O$ | 1,220 |
| Graphite | 12.0 | None | 770 |
| Do | 12.0 | 1% $CuCl_2.2H_2O$ | 1,760 |

It can thus be seen that the method of treating finely divided solids with an agent which increases the hardness and adhesivity of the asphalt binder, giving high strength compositions, is not restricted to soils having an appreciable clay content but, in fact, may be used successfully with a variety of solids.

It is therefore possible by the present invention to prepare dense, hard materials and articles of manufacture by both wet and dry compaction methods, which in compressive strength exceed high strength concrete, are solvent resistant, and have enhanced tensile strength. This discovery particularly opens up the possibility of building strong, light weight load bearing structures, particularly when the materials are prestressed in accordance with established practices.

What is claimed is:

1. In the process of preparing stabilized aggregate asphalt compositions of enhanced compressive strength wherein the finely subdivided solid aggregate is admixed with an asphalt composition, compacted to the desired form, and cured, the improvement which comprises:
    pretreating the finely subdivided solid aggregate prior to admixture with the asphalt with from 0.1 to 5.0 wt. percent of a metal compound containing a polyvalent metal element in other than the lowest oxidation state selected from the group consisting of Group I metals, Group V metals, Group VI metals, Group VIII metals and mixtures thereof, and
    curing said pretreated solid asphalt mixture at a temperature greater than 150° F., thereby providing a stabilized solvent resistant composition.

2. A process as described in claim 1 wherein said solid aggregate is a soil having a clay content between 10 and 60 wt. percent.

3. A process as described in claim 1 wherein said curing temperature is between 150° F. and 500° F.

4. A process as described in claim 1 wherein said metal element is selected from the group of metals consisting of copper, iron, chromium, manganese and vanadium.

5. A process for preparing stabilized aggregate asphalt composition of enhanced strength and solvent resistance, which process comprises:
    treating a finely subdivided solid aggregate with from 0.1 to 5.0 wt. percent of a metal cross linking compound containing a polyvalent metal element in other than the lowest oxidation state selected from the group consisting of Group I metals, Group V metals, Group VI metals, Group VIII metals and mixtures thereof,
    mixing the pretreated aggregate with from 8 to 30 wt. percent of an asphalt in an organic solvent,
    removing sufficient solvent to give from 0.4 to 4.0 wt. percent of solvent and an ASTM penetration value of the asphalt and solvent of from 20 to 335 at the time of compaction,
    compacting said pretreated aggregate asphalt mixture at a pressure of at least 500 p.s.i., and
    curing said compacted mass at a temperature greater than 150° F.

6. A process as described in claim 5 wherein said solid aggregate is a soil having a clay content between 10 and 60 wt. percent.

7. A process as described in claim 5 wherein the treating of the subdivided solid aggregate is accomplished by contacting the solid aggregate with an aqueous solution of the metal compound, and subsequently removing the water from the pretreated aggregate so that the pretreated aggregate contains less than 5.0 wt. percent water prior to admixture with the asphalt.

8. A process as described in claim 5 wherein said metal element is selected from the group of metals consisting of copper, iron, chromium, manganese and vanadium.

9. A process as described by the process of claim 5 wherein the metal compound is a ferric halide.

10. In a process for preparing stabilized aggregate asphalt compositions of enhanced compressive strength wherein a soil is admixed with an asphalt composition, compacted to the desired form, and cured, the improvement which comprises:
    pretreating the soil prior to admixture with the asphalt with from 0.1 to 5.0 wt. percent of a cupric salt, and
    curing said pretreated soil asphalt mixture at a temperature greater than 150° F.

References Cited by the Examiner

UNITED STATES PATENTS

| | | | |
| --- | --- | --- | --- |
| 2,089,713 | 8/1937 | Saal | 106—283 |
| 2,212,574 | 8/1940 | Roth | 106—287 |
| 2,550,371 | 4/1951 | Naps et al. | 106—287 |
| 2,626,872 | 1/1953 | Miscall | 106—281 |
| 2,775,530 | 12/1956 | Gagle et al. | 106—280 |
| 2,889,231 | 6/1959 | Gagle et al. | 106—280 |
| 3,092,437 | 6/1963 | Carter et al. | 18—47.5 |

ALEXANDER H. BRODMERKEL, *Primary Examiner.*

JOSEPH REBOLD, MORRIS LIEBMAN, *Examiners.*

J. B. EVANS, *Assistant Examiner.*